US009503931B2

(12) United States Patent
Vermani et al.

(10) Patent No.: US 9,503,931 B2
(45) Date of Patent: Nov. 22, 2016

(54) ENHANCEMENTS TO THE MU-MIMO VHT PREAMBLE TO ENABLE MODE DETECTION

(75) Inventors: Sameer Vermani, San Diego, CA (US); Lin Yang, San Diego, CA (US); (Continued)

(73) Assignee: QUALCOMM Incorporated, San Diego, CA (US)

( * ) Notice: Subject to any disclaimer, the term of this patent is extended or adjusted under 35 U.S.C. 154(b) by 622 days.

(21) Appl. No.: 12/848,058

(22) Filed: Jul. 30, 2010

(65) Prior Publication Data
US 2011/0188482 A1    Aug. 4, 2011

Related U.S. Application Data

(60) Provisional application No. 61/233,451, filed on Aug. 12, 2009, provisional application No. 61/234,927, filed on Aug. 18, 2009.

(51) Int. Cl.
*H04W 28/06* (2009.01)
*H04L 27/00* (2006.01)
(Continued)

(52) U.S. Cl.
CPC ........ *H04W 28/065* (2013.01); *H04L 27/0012* (2013.01); *H04L 27/2602* (2013.01);
(Continued)

(58) Field of Classification Search
USPC ....... 370/328, 329, 334, 335, 338, 465, 241; 375/136, 137, 295
See application file for complete search history.

(56) References Cited

U.S. PATENT DOCUMENTS 7,193,506 B2    3/2007 Logvinov et al.
7,599,332 B2   10/2009 Zelst et al.
(Continued)

FOREIGN PATENT DOCUMENTS

CN    101478808 A    7/2009
JP    2007221187 A    8/2007
(Continued)

OTHER PUBLICATIONS

Draft Standard for Information Technology Telecommunications and information exchange between systems. Local and metropolitan area networks Specific requirements Part 11: Wireless LAN Medium Access Control (MAC) and Physical Layer (PHY) specifications Amendment 5 Enhancements for Higher Throughput IEEE P802.11N/D9.0, Mar. 1, 2009 (Mar. 1, 2009), pp. 1,2,276-297, XP002606795. IEEE P802.11n/D9.0 Retrieved from the Internet: URL:http://ieeexplore.ieee.org/stamp/stamp.jsp"tp= &arnumber=4810960 [retrieved on Oct. 25, 2010] p. 278 p. 292 p. 29.
(Continued)

*Primary Examiner* — Albert T Chou
(74) *Attorney, Agent, or Firm* — Dang M. Vo

(57) ABSTRACT

Certain aspects of the present disclosure present a technique for enabling a receiver to detect mode of transmission of a signal based on a common field transmitted to all the receivers. The proposed technique includes frame structure in which information about the transmission mode is transmitted in a first portion of a SIG field to all the receivers.

49 Claims, 10 Drawing Sheets

(75) Inventors: Hemanth Sampath, San Diego, CA (US); Vincent Knowles Jones, Redwood City, CA (US); Didier Johannes Richard Van Nee, Breukelen (NL)

(51) Int. Cl.
*H04L 27/26* (2006.01)
*H04L 27/34* (2006.01)
*H04W 84/12* (2009.01)

(52) U.S. Cl.
CPC ......... *H04L 27/2613* (2013.01); *H04L 27/345* (2013.01); *H04W 84/12* (2013.01)

(56) References Cited

U.S. PATENT DOCUMENTS

| | | | |
|---|---|---|---|
| 7,920,599 | B1 | 4/2011 | Subramanian et al. |
| 7,974,225 | B2 | 7/2011 | Kasher |
| 8,031,806 | B2 | 10/2011 | Trachewsky et al. |
| 8,498,245 | B2 | 7/2013 | Wu et al. |
| 8,548,007 | B2 | 10/2013 | Kwon et al. |
| 8,582,418 | B2 | 11/2013 | Lee et al. |
| 2006/0126545 | A1 | 6/2006 | Nanda |
| 2006/0193340 | A1* | 8/2006 | Jones et al. ............... 370/465 |
| 2006/0250943 | A1 | 11/2006 | Mujtaba et al. |
| 2007/0047666 | A1 | 3/2007 | Trachewsky |
| 2007/0165521 | A1 | 7/2007 | Malik et al. |
| 2007/0189263 | A1 | 8/2007 | Izumi et al. |
| 2007/0253952 | A1 | 11/2007 | Alvarez Vallina et al. |
| 2007/0263564 | A1 | 11/2007 | Hansen et al. |
| 2008/0109711 | A1 | 5/2008 | Morioka et al. |
| 2009/0232079 | A1 | 9/2009 | Khandekar et al. |
| 2010/0202301 | A1 | 8/2010 | Wen et al. |
| 2010/0260159 | A1* | 10/2010 | Zhang et al. .............. 370/338 |
| 2010/0310002 | A1* | 12/2010 | Lauer et al. .............. 375/267 |
| 2010/0315953 | A1* | 12/2010 | Pare et al. ............... 370/241 |
| 2010/0322295 | A1 | 12/2010 | Tzannes et al. |
| 2011/0013575 | A1 | 1/2011 | Liao et al. |
| 2011/0013721 | A1* | 1/2011 | Liao et al. ............... 375/295 |
| 2011/0032875 | A1* | 2/2011 | Erceg et al. .............. 370/328 |
| 2011/0096863 | A1 | 4/2011 | Lee et al. |
| 2011/0110454 | A1 | 5/2011 | Sampath et al. |
| 2012/0170563 | A1 | 7/2012 | Abraham et al. |
| 2013/0201835 | A1 | 8/2013 | Banerjea et al. |
| 2015/0078368 | A1 | 3/2015 | Vermani et al. |

FOREIGN PATENT DOCUMENTS

| | | |
|---|---|---|
| JP | 2010206730 A | 9/2010 |
| JP | 2012523774 A | 10/2012 |
| TW | 200711381 | 3/2007 |
| WO | WO03077457 A1 | 9/2003 |
| WO | WO-2006086584 A2 | 8/2006 |
| WO | WO-2008096789 A1 | 8/2008 |
| WO | WO-2010120692 A1 | 10/2010 |

OTHER PUBLICATIONS

International Search Report and Written Opinion—PCT/US2010/045389, International Search Authority—European Patent Office—Dec. 3, 2010.
Zhang H et al., "802.11ac Preamble", IEEE 802.11-10/0070R0, [Online] Jan. 18, 2010 (Jan. 18, 2010), pp. 1-11, XP002610760, Retrieved from the Internet: URL:https://mentor.ieee.org/802.11/dcn/10/11-10-0359-00-00ac-802-11ac-preambie.ppt> [retrieved on Nov. 22, 2010].
European Search Report—EP14020035—Search Authority—Berlin—Apr. 15, 2014.
Lanante L., et al., "IEEE802.11ac Preamble with Legacy 802.11a/n Backward Compatibility", IEEE 802.11-09/0847r1, Nov. 18, 2009, pp. 1-27.
Nee, R.V., et al., "UL MU-MIMO for 11ac", IEEE 802.11-09/0852-00-00ac, Jul. 2009.
Syafei, W.A., et al., "A 1.2.Gbps wireless LAN system for 4K digital cinema transmission", The Institute of Electronics, Information and Communication Engineers (IEICE) Technical Report, Jun. 4, 2009, vol. 109, No. 78, pp. 85-90, SIS 2009-15.
Taiwan Search Report—TW099126985—TIPO—Oct. 17, 2013.

* cited by examiner

… (SIG) field, transmitting a first portion of the SIG field of the frame structure, wherein the first portion is common to a plurality of apparatuses, wherein a transmission mode of the frame structure is detected based on the first portion of the SIG field, and transmitting a second portion of the SIG field of the frame structure, wherein the second portion is specific to each of the plurality of apparatuses.

ENHANCEMENTS TO THE MU-MIMO VHT PREAMBLE TO ENABLE MODE DETECTION

CLAIM OF PRIORITY UNDER 35 U.S.C. §119

The present Application for Patent claims priority to U.S. Provisional Patent Application Ser. No. 61/233,451, entitled, "Enhancements to the MU-MIMO VHT Downlink Preamble to Enable Mode Detection," filed Aug. 12, 2009; and U.S. Provisional Patent Application Ser. No. 61/234,927, entitled, "Enhancements to the MU-MIMO VHT Preamble to Enable Mode Detection," filed Aug. 18, 2009; and assigned to the assignee hereof and hereby expressly incorporated by reference herein.

TECHNICAL FIELD

Certain aspects of the present disclosure generally relate to wireless communications and, more particularly, to detecting transmission mode of a signal at a receiver.

BACKGROUND

In order to address the issue of increasing bandwidth requirements that are demanded for wireless communications systems, different schemes are being developed to allow multiple user terminals to communicate with a single access point by sharing the channel resources while achieving high data throughputs. Multiple Input or Multiple Output (MIMO) technology represents one such approach that has recently emerged as a popular technique for the next generation communication systems. MIMO technology has been adopted in several emerging wireless communications standards such as the Institute of Electrical and Electronics Engineers (IEEE) 802.11 standard. IEEE 802.11 denotes a set of Wireless Local Area Network (WLAN) air interface standards developed by the IEEE 802.11 committee for short-range communications (e.g., tens of meters to a few hundred meters).

A MIMO wireless system employs a number ($N_T$) of transmit antennas and a number ($N_R$) of receive antennas for data transmission. A MIMO channel formed by the $N_T$ transmit and $N_R$ receive antennas may be decomposed into $N_S$ spatial streams, where, for all practical purposes, $NS \leq \min\{N_T, N_R\}$. The $N_S$ spatial streams may be used to transmit $N_S$ independent data streams to achieve greater overall throughput.

In wireless networks with a single access point and multiple stations, concurrent transmissions may occur on multiple channels toward different stations, both in the uplink and downlink directions.

SUMMARY

Certain aspects of the present disclosure provide a method for wireless communications. The method generally includes receiving a first portion of a signal (SIG) field of a frame structure, the SIG field comprising the first portion which is common to a plurality of apparatuses and a second portion which is specific to each apparatus, determining a transmission mode of the frame structure based on the first portion of the SIG field, and receiving remaining part of the frame structure based on the transmission mode.

Certain aspects of the present disclosure provide a method for wireless communications. The method generally includes generating a frame structure comprising a signal (SIG) field, transmitting a first portion of the SIG field of the frame structure, wherein the first portion is common to a plurality of apparatuses, wherein a transmission mode of the frame structure is detected based on the first portion of the SIG field, and transmitting a second portion of the SIG field of the frame structure, wherein the second portion is specific to each of the plurality of apparatuses.

Certain aspects of the present disclosure provide an apparatus for wireless communications. The apparatus generally includes a receiver configured to receive a first portion of a signal (SIG) field of a frame structure, the SIG field comprising the first portion which is common to a plurality of apparatuses and a second portion which is specific to each apparatus, circuit configured to determine a transmission mode of the frame structure based on the first portion of the SIG field, and wherein the receiver is further configured to receive remaining part of the frame structure based on the transmission mode.

Certain aspects of the present disclosure provide an apparatus for wireless communications. The apparatus generally includes circuit configured to generate a frame structure comprising a signal (SIG) field, a transmitter configured to transmit a first portion of the SIG field of the frame structure, wherein the first portion is common to a plurality of apparatuses, wherein a transmission mode of the frame structure is detected based on the first portion of the SIG field, and wherein the transmitter is further configured to transmit a second portion of the SIG field of the frame structure, wherein the second portion is specific to each of the plurality of apparatuses.

Certain aspects of the present disclosure provide an apparatus for wireless communications. The apparatus generally includes means for receiving a first portion of a signal (SIG) field of a frame structure, the SIG field comprising the first portion which is common to a plurality of apparatuses and a second portion which is specific to each apparatus, means for determining a transmission mode of the frame structure based on the first portion of the SIG field, and wherein the means for receiving is further configured to receive remaining part of the frame structure based on the transmission mode.

Certain aspects of the present disclosure provide an apparatus for wireless communications. The apparatus generally includes means for generating a frame structure comprising a signal (SIG) field, means for transmitting a first portion of the SIG field of the frame structure, wherein the first portion is common to a plurality of apparatuses, wherein a transmission mode of the frame structure is detected based on the first portion of the SIG field, and wherein the means for transmitting is further configured to transmit a second portion of the SIG field of the frame structure, wherein the second portion is specific to each of the plurality of apparatuses.

Certain aspects of the present disclosure provide a computer-program product for wireless communications, comprising a computer-readable medium comprising instructions. The instructions are executable for receiving a first portion of a signal (SIG) field of a frame structure, the SIG field comprising the first portion which is common to a plurality of apparatuses and a second portion which is specific to each apparatus, determining a transmission mode of the frame structure based on the first portion of the SIG field, and receiving remaining part of the frame structure based on the transmission mode.

Certain aspects of the present disclosure provide a computer-program product for wireless communications, comprising a computer-readable medium comprising instructions. The instructions are executable for generating a frame structure comprising a signal (SIG) field, transmitting a first portion of the SIG field of the frame structure, wherein the first portion is common to a plurality of apparatuses, wherein a transmission mode of the frame structure is detected based on the first portion of the SIG field, and transmitting a second portion of the SIG field of the frame structure, wherein the second portion is specific to each of the plurality of apparatuses.

Certain aspects provide a station for wireless communications. The station generally includes at least one antenna, a receiver configured to receive, via the at least one antenna, a first portion of a signal (SIG) field of a frame structure, the SIG field comprising the first portion which is common to a plurality of apparatuses and a second portion which is specific to each apparatus, circuit configured to determine a transmission mode of the frame structure based on the first portion of the SIG field, and wherein the receiver is further configured to receive remaining part of the frame structure based on the transmission mode.

Certain aspects provide an access point for wireless communications. The access point generally includes a plurality of antennas, circuit configured to generate a frame structure comprising a signal (SIG) field, a transmitter configured to transmit, via the plurality of antennas, a first portion of the SIG field of the frame structure, wherein the first portion is common to a plurality of apparatuses, wherein a transmission mode of the frame structure is detected based on the first portion of the SIG field, and wherein the transmitter is further configured to transmit a second portion of the SIG field of the frame structure, wherein the second portion is specific to each of the plurality of apparatuses.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Various aspects of certain aspects of the present disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

The word "exemplary" is used herein to mean "serving as an example, instance, or illustration." Any aspect described herein as "exemplary" is not necessarily to be construed as preferred or advantageous over other aspects. Also as used herein, the term "legacy stations" generally refers to wireless network nodes that support the Institute of Electrical and Electronics Engineers (IEEE) 802.11n or earlier versions of the IEEE 802.11 standard.

The multi-antenna transmission techniques described herein may be used in combination with various wireless technologies such as Code Division Multiple Access (CDMA), Orthogonal Frequency Division Multiplexing (OFDM), Time Division Multiple Access (TDMA), Spatial Division Multiple Access (SDMA), and so on. Multiple user terminals can concurrently transmit/receive data via different (1) orthogonal code channels for CDMA, (2) time slots for TDMA, or (3) sub-bands for OFDM. A CDMA system may implement IS-2000, IS-95, IS-856, Wideband-CDMA (W-CDMA), or some other standards. An OFDM system may implement IEEE 802.11 or some other standards. A TDMA system may implement GSM or some other standards. These various standards are known in the art.

An Example MIMO System

Figure 1:
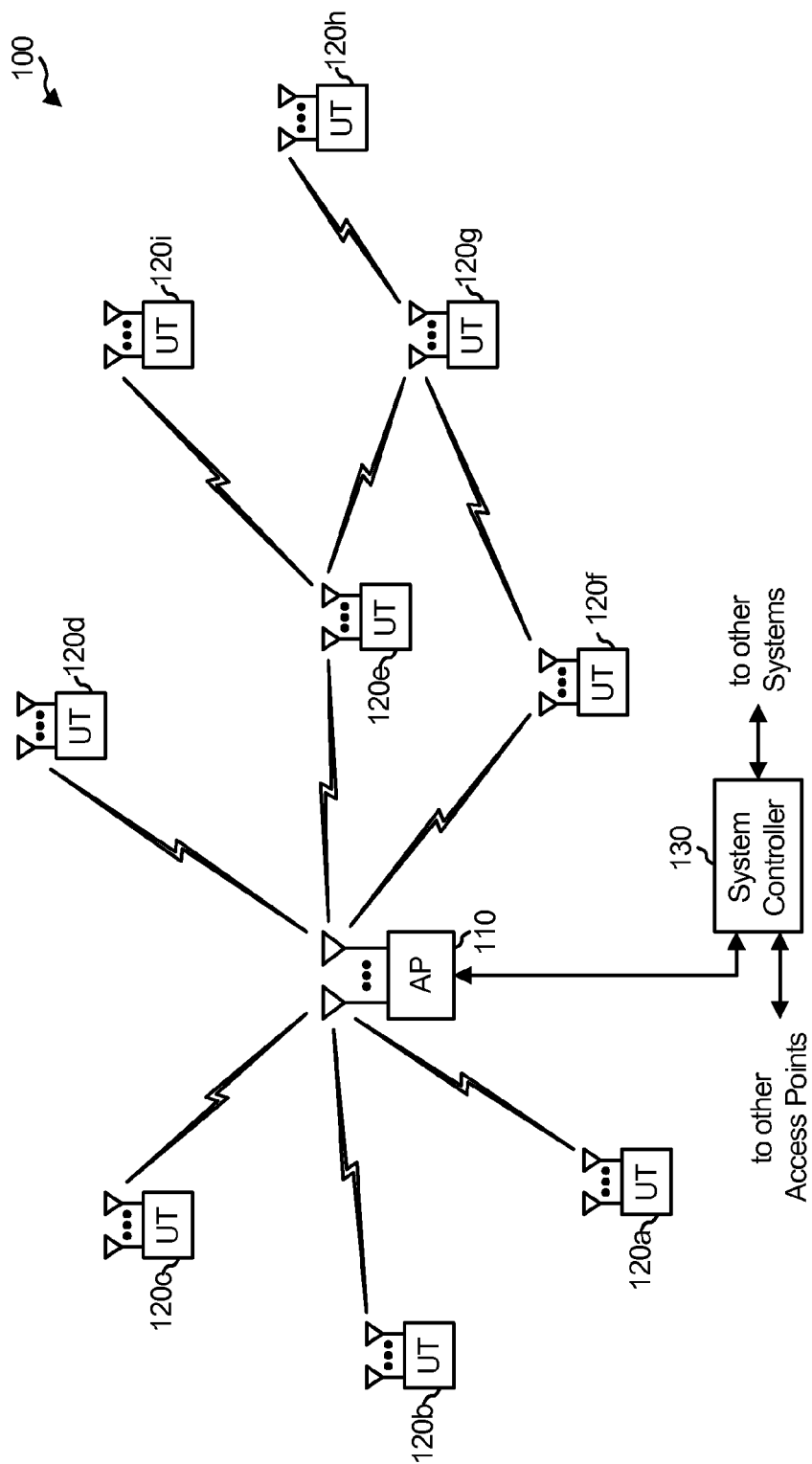
FIG. 1 illustrates a diagram of a wireless communications network in accordance with certain aspects of the present disclosure.

FIG. 1 illustrates a multiple-access MIMO system 100 with access points and user terminals. For simplicity, only one access point 110 is shown in FIG. 1. An access point (AP) is generally a fixed station that communicates with the user terminals and may also be referred to as a base station or some other terminology. A user terminal may be fixed or mobile and may also be referred to as a mobile station, a station (STA), a client, a wireless device, or some other terminology. A user terminal may be a wireless device, such as a cellular phone, a personal digital assistant (PDA), a handheld device, a wireless modem, a laptop computer, a personal computer, etc.

Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

System 100 employs multiple transmit and multiple receive antennas for data transmission on the downlink and uplink. Access point 110 is equipped with a number $N_{ap}$ of antennas and represents the multiple-input (MI) for downlink transmissions and the multiple-output (MO) for uplink transmissions. A set $N_u$ of selected user terminals 120 collectively represents the multiple-output for downlink transmissions and the multiple-input for uplink transmissions. In certain cases, it may be desirable to have $N_{ap} \geq N_u \geq 1$ if the data symbol streams for the $N_u$ user terminals are not multiplexed in code, frequency, or time by some means. $N_u$ may be greater than $N_{ap}$ if the data symbol streams can be multiplexed using different code channels with CDMA, disjoint sets of sub-bands with OFDM, and so on. Each selected user terminal transmits user-specific data to and/or receives user-specific data from the access point. In general, each selected user terminal may be equipped with one or multiple antennas (i.e., $N_{ut} \geq 1$). The $N_u$ selected user terminals can have the same or different number of antennas.

MIMO system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported).

Figure 2:
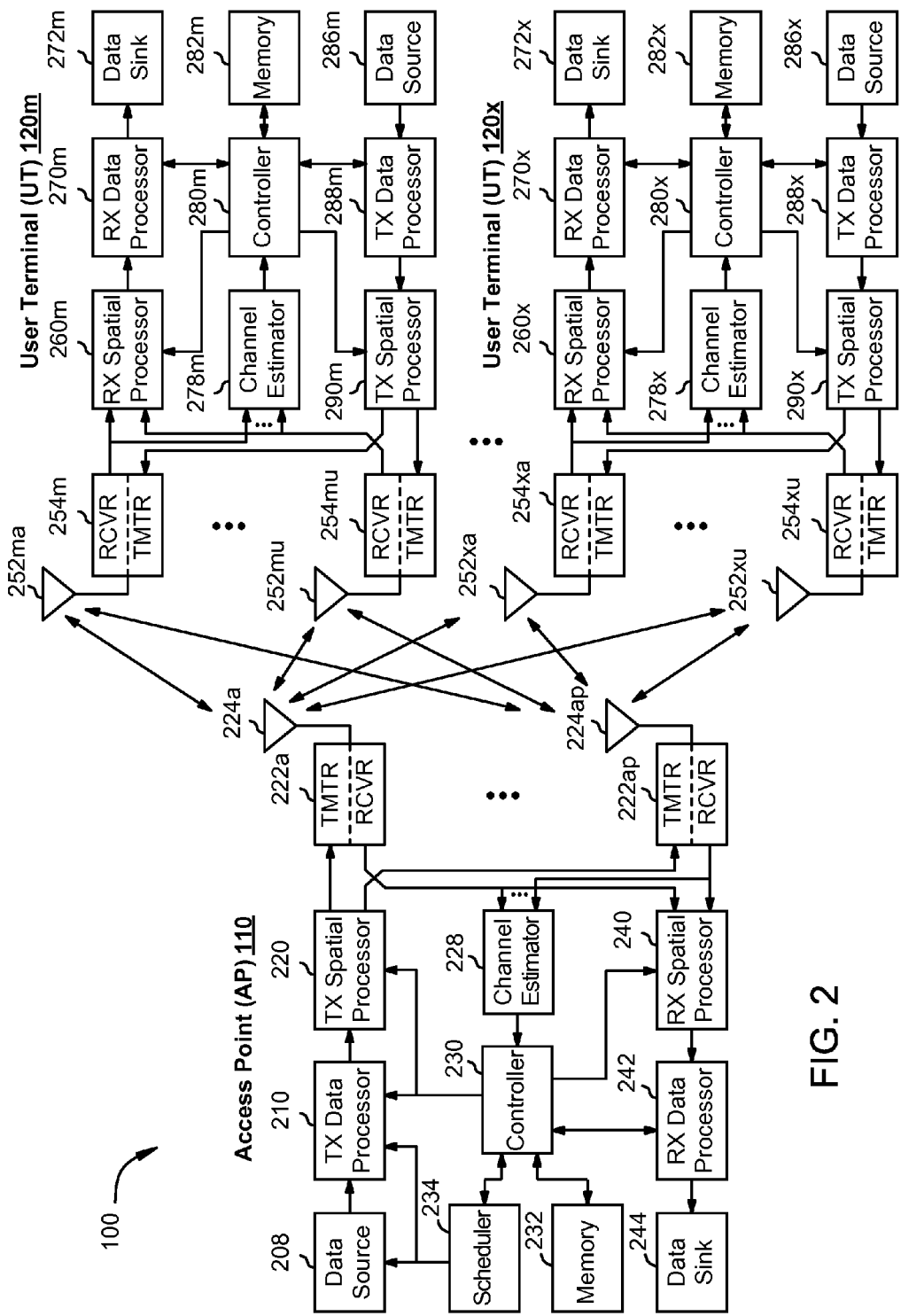
FIG. 2 illustrates a block diagram of an example access point and user terminals in accordance with certain aspects of the present disclosure.

FIG. 2 shows a block diagram of access point 110 and two user terminals 120m and 120x in MIMO system 100. Access point 110 is equipped with $N_{ap}$ antennas 224a through 224ap. User terminal 120m is equipped with $N_{ut,m}$ antennas 252ma through 252mu, and user terminal 120x is equipped with $N_{ut,x}$ antennas 252xa through 252xu. Access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a frequency channel, and a "receiving entity" is an independently operated apparatus or device capable of receiving data via a frequency channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data $\{d_{up,m}\}$ for the user terminal based on the coding and modulation schemes associated with the rate selected for the user terminal and provides a data symbol stream $\{s_{up,m}\}$. A TX spatial processor 290 performs spatial processing on the data symbol stream $\{s_{up,m}\}$ and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal.

$N_{ut,m}$ transmitter units 254 provide $N_{ut,m}$ uplink signals for transmission from $N_{ut,m}$ antennas 252 to the access point 110.

A number $N_{up}$ of user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), successive interference cancellation (SIC), or some other technique. Each recovered uplink data symbol stream $\{\hat{s}_{up,m}\}$ is an estimate of a data symbol stream $\{s_{up,m}\}$ transmitted by a respective user terminal. An RX data processor 242 processes (e.g., demodulates, deinterleaves, and decodes) each recovered uplink data symbol stream $\{\hat{s}_{up,m}\}$ in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230 and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing on the $N_{dn}$ downlink data symbol streams, and provides $N_{ap}$ transmit symbol streams for the $N_{ap}$ antennas. Each transmitter unit (TMTR) 222 receives and processes a respective transmit symbol stream to generate a downlink signal. $N_{ap}$ transmitter units 222 provide $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit (RCVR) 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream $\{\hat{s}_{dn,m}\}$ for the user terminal. The receiver spatial processing is performed in accordance with the CCMI, MMSE, or some other technique. An RX data processor 270 processes (e.g., demodulates, deinterleaves, and decodes) the recovered downlink data symbol stream to obtain decoded data for the user terminal.

At each user terminal 120, $N_{ut,m}$ antennas 252 receive the $N_{ap}$ downlink signals from access point 110. Each receiver unit (RCVR) 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream $\{s_{dn,m}\}$ for the user terminal. The receiver spatial processing is performed in accordance with the CCMI, MMSE, or some other technique. An RX data processor 270 processes (e.g., demodulates, deinterleaves, and decodes) the recovered downlink data symbol stream to obtain decoded data for the user terminal.

Figure 3:
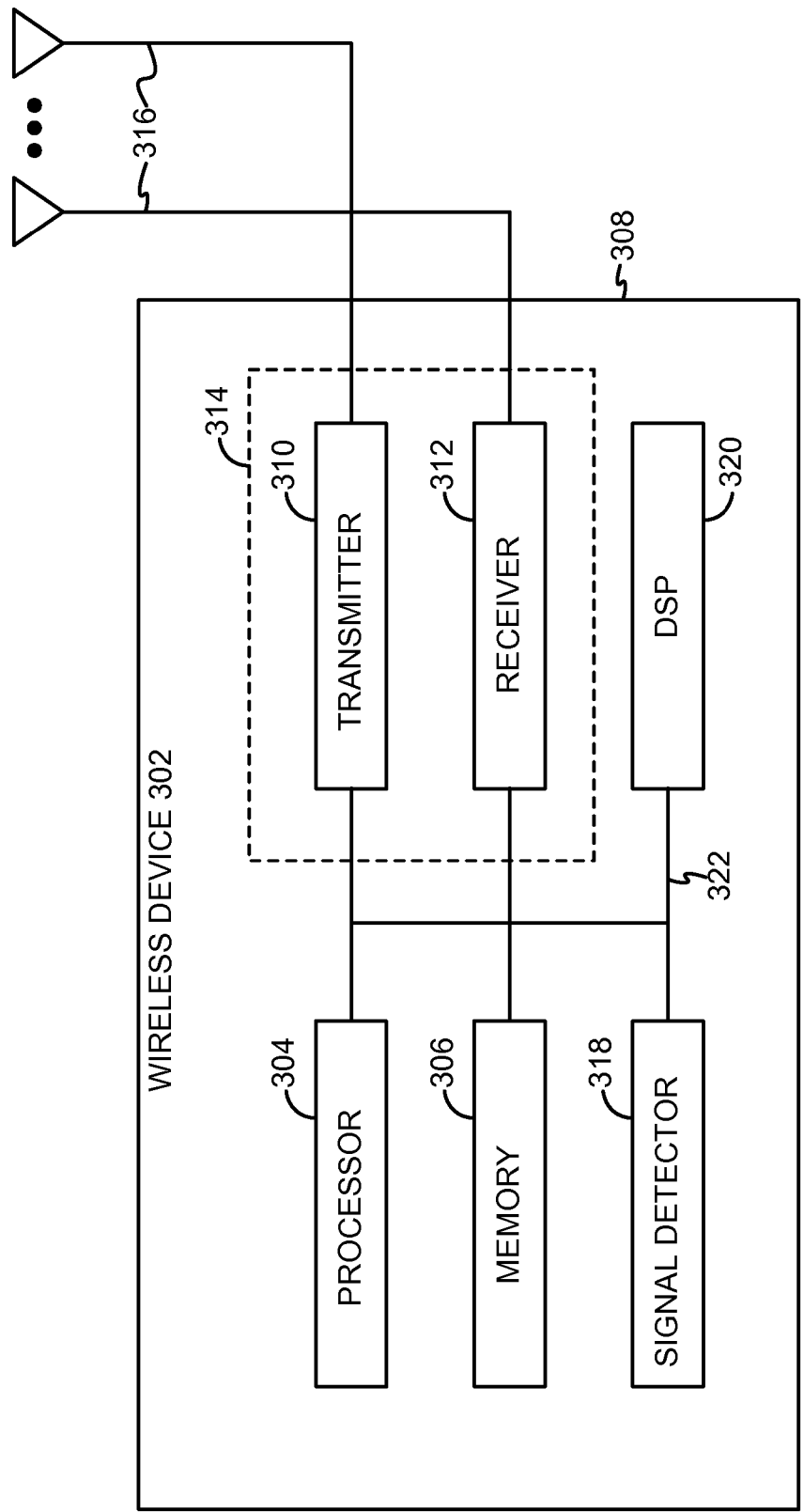
FIG. 3 illustrates a block diagram of an example wireless device in accordance with certain aspects of the present disclosure.

FIG. 3 illustrates various components that may be utilized in a wireless device 302 that may be employed within the system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Those skilled in the art will recognize the techniques described herein may be generally applied in systems utilizing any type of multiple access schemes, such as SDMA, OFDMA, CDMA, SDMA, and combinations thereof.

Enhancements to the MU-MIMO VHT Preamble to Enable Mode Detection

Certain aspects of the present disclosure provide techniques for detecting transmission mode of a signal at a receiver. For example, a transmitter may transmit signals using different standards, such as the IEEE 802.11n/a/ac standards. A receiver should be able to detect the transmission mode (i.e., the standard used for transmission) of a signal in order to be able to process the signal correctly. In both uplink and downlink SDMA, information about the transmission mode of a signal may be included in the preamble of each frame to be used at the receivers.

Figure 4A:
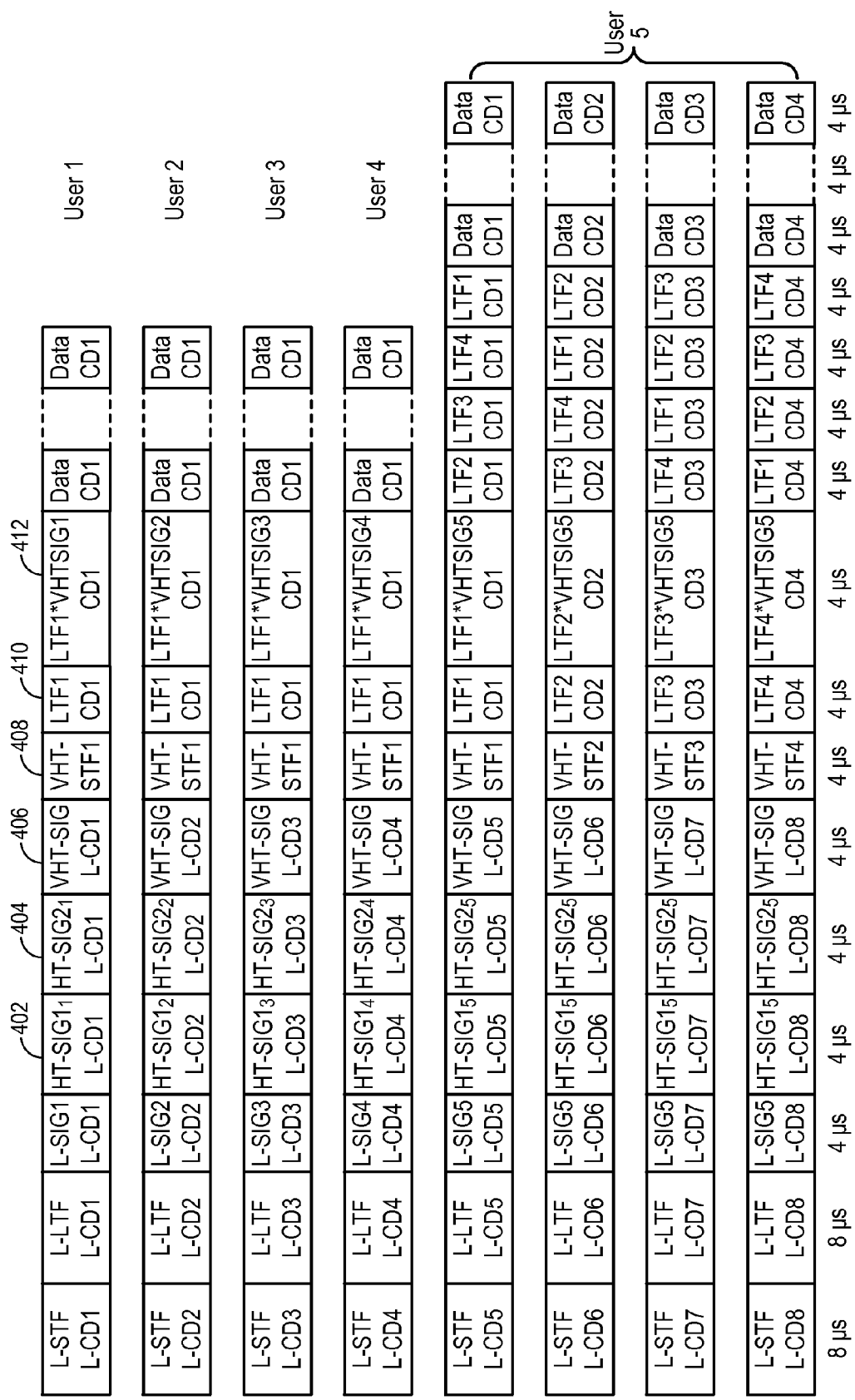
FIGS. 4A and 4B illustrate proposed frame structures for very high throughput (VHT) downlink Multi-User-Multiple Input Multiple Output (MU-MIMO) system, in accordance with certain aspects of the present disclosure.
Figure 4B:
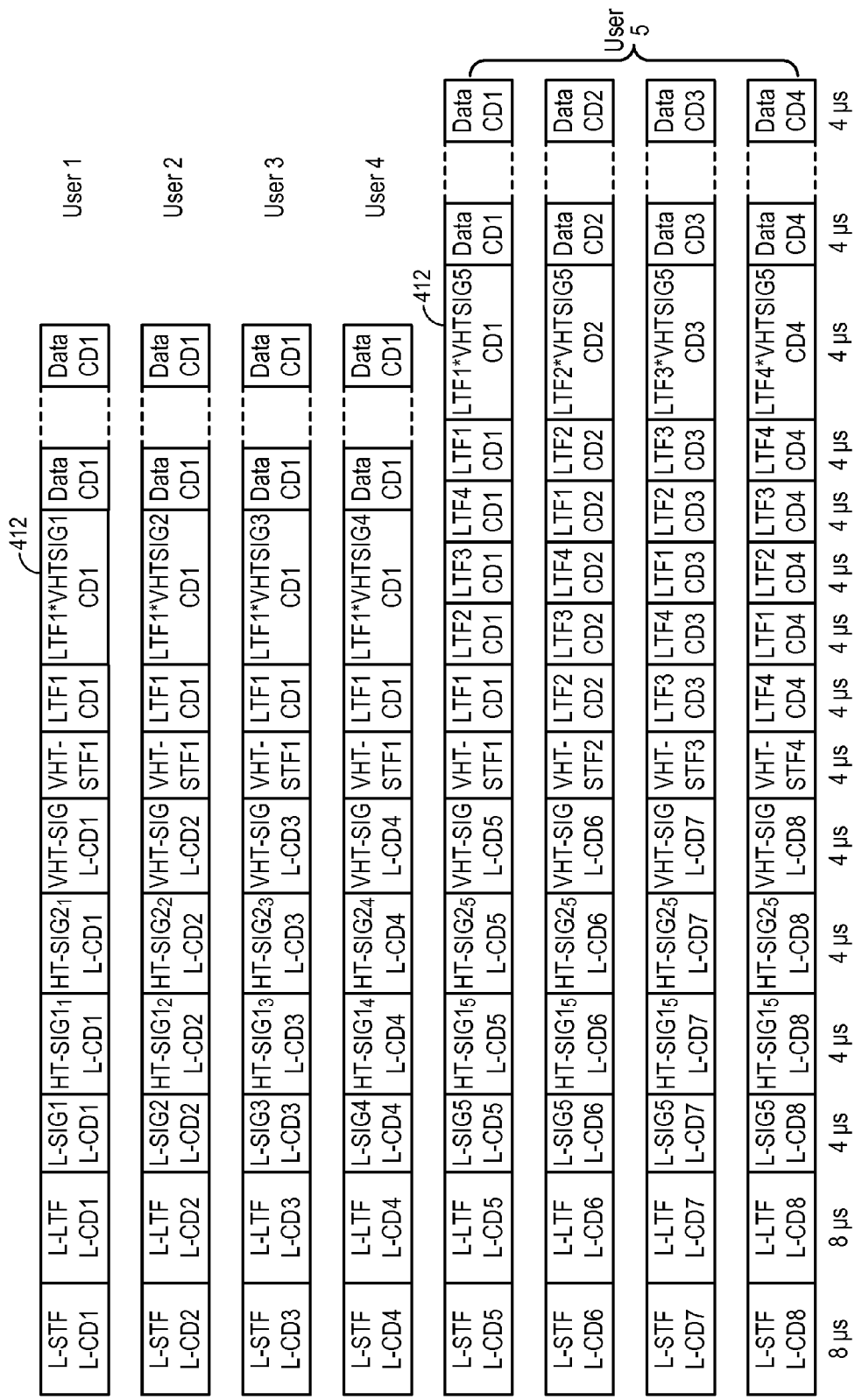

FIGS. 4A and 4B illustrate proposed frame structures for very high throughput (VHT) downlink Multi-User-Multiple Input Multiple Output (MU-MIMO) system, in accordance with certain aspects of the present disclosure.

As illustrated in FIG. 4A, the preamble fields in a frame structure, such as short training field (L-STF), long training field (L-LTF), signal (L-SIG), high throughput signal (HT-SIG1) 402 and HT-SIG2 404 are common for all users, and therefore, not beamformed. The field very high throughput-short training field (VHT-STF) 408 is the first field in the frame that is beamformed. In addition, the rest of the fields in the frame that are transmitted after the VHT-STF field are also beamformed to specific users.

For certain aspects of the present disclosure, the STF field may be used to adjust an automatic gain control (AGC) setting. In order for a station to process a VHT-STF field 408 correctly, the station needs to know mode of transmission or the standard (e.g., IEEE 802.11n, IEEE 802.11ac or IEEE 802.11a) that is used for the transmission.

The information about transmission mode of the signal may be included in very high throughput signal (VHT-SIG) field. The VHT-SIG field may be divided into two portions. For certain aspects, each of the first and the second portions of the VHT-SIG field may span one or more OFDM symbols.

The first portion 406 of the VHT-SIG may be common among all the users and not beamformed. This portion may arrive after the HT-SIG2 404 in a downlink frame to notify the receiving stations of the transmission mode.

The second portion 412 of the VHT-SIG field may be specific to each STA and, hence, beamformed. For certain aspects, as illustrated in FIG. 4A, the second portion 412 of the VHT-SIG may be transmitted after the first long training field (LTF) for all the stations. For certain aspects, as illustrated in FIG. 4B, the second portion 412 of the VHT-SIG field may be transmitted to the stations after all of the long training fields are transmitted.

FIG. 4B illustrates a proposed frame structure for very high throughput (VHT) downlink MU-MIMO system, in accordance with certain aspects of the present disclosure. In this figure, most of the fields are similar to the FIG. 4A. The only difference between FIGS. 4A and 4B is the location of the second portion 412 of the VHT-SIG field. In FIG. 4B, the second portion 412 of the VHT-SIG field is transmitted to each station following all the long training fields assigned to that station.

As illustrated in FIGS. 4A and 4B, single spatial streams are assigned to users 1 through 4. Therefore, each user receives a single LTF field 410 after receiving the VHT-STF field 408. On the other hand, four spatial streams are assigned to user5, therefore, user5 receives four LTF fields 410, one corresponding to each of the spatial streams. For certain aspects of the present disclosure, at least one LTF may be utilized to estimate the channel for each spatial stream at the receiver.

According to certain aspects, a "training sequence" may happen, where the AP is able to obtain "signatures" for each of the stations. The AP may use these signatures to perform beamforming so each station can recognize its corresponding second portion of the VHT-SIG field.

For certain aspects of the present disclosure, in downlink SDMA, the first portion of the VHT-SIG field which is received after the VHT-LTF1 field, may indicate the number of remaining LTF fields and the modulation and coding scheme (MCS) used in the transmission. In uplink SDMA, the VHT-SIG field may be received after all of the LTF fields to indicate the MCS used for uplink transmission to the access point.

In both uplink and downlink SDMA, the first portion of the VHT-SIG field is received before reception of the VHT-STF field. Therefore, the receiver decodes the VHT-SIG field, and detects the transmission mode (i.e., IEEE 802.11ac/a/n) before receiving the VHT-STF field. As a result, at the time of start of VHT-STF field 408, a station knows if the transmission mode is in compliance with the IEEE 802.11ac, IEEE 802.11a or the IEEE 802.11n standard.

Figure 5:
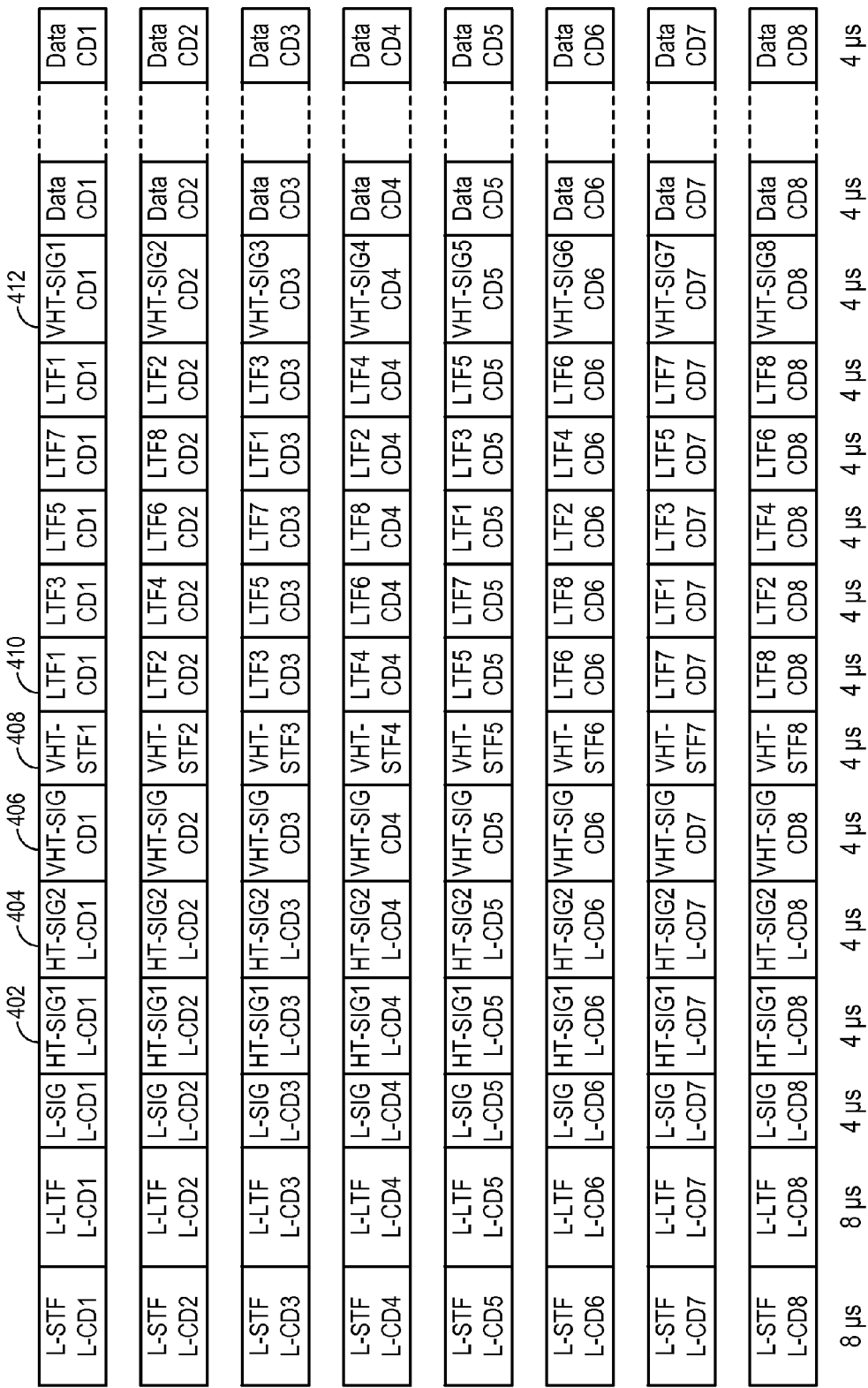
FIG. 5 illustrates a proposed frame structure for VHT uplink MU-MIMO system, in accordance with certain aspects of the present disclosure.

FIG. 5 illustrates a proposed frame structure for very high throughput (VHT) uplink MU-MIMO system, in accordance with certain aspects of the present disclosure. In this frame structure, similar to downlink, the first portion 406 of the VHT-SIG field is transmitted after HT-SIG2 field 404. The second portion 412 of the VHT-SIG field is transmitted after all of the LTFs are transmitted (similar to FIG. 4B). The rest of the fields in this frame structure are similar to the downlink frames illustrated in FIGS. 4A and 4B.

For certain aspects of the present disclosure, a unified frame structure for uplink and downlink may be utilized to enable the receiver to detect the transmission mode (i.e., IEEE 802.11n/a/ac). The unified frame structure (as shown in FIGS. 4B and 5) may include a VHT-SIG field that is divided into two portions. The first portion of the VHT-SIG field may be common among all the users and the second portion of the VHT-SIG field may be specific to each user. For certain aspects, for a unified uplink-downlink frame structure, the second portion of VHT-SIG field may be transmitted after all of the VHT-LTF fields to allow uniformity between uplink and downlink.

For certain aspects of the present disclosure, in a system utilizing a unified frame structure for both uplink and downlink, the stations receiving a frame in downlink may perform auto-detection to determine if the symbol after the VHT-LTF1 field is the second portion of VHT-SIG field or an LTF field. The station may use one of the existing HT-SIG detection algorithms for this purpose. Therefore, no additional hardware may be required. By detecting the second portion of the VHT-SIG field, the station knows that all of the long training fields are received, and is able to count the number of different LTF fields assigned to the station.

For certain aspects, the first portion of the VHT-SIG field may also provide receivers utilizing the IEEE802.11ac standard with information about mode of transmission (e.g., DL-SDMA, UL-SDMA or MIMO 802.11ac), bandwidth (e.g., 20/40/80 MHz), and other common parameters such as total transmission length, use of delimiter or zero-padding, maximum number of LTFs or the longest MU-MIMO transmission time among all spatial streams, and other parameters. The total transmission length may have already been included in the HT-SIG field, but a separate length may be needed if the receivers utilizing the IEEE 802.11n and receivers utilizing the IEEE 802.11ac are spoofed for different durations.

After receiving the first portion of the VHT-SIG field, a station may detect mode of transmission by utilizing the first portion of the VHT-SIG field. For certain aspects, the station may employ a special constellation (e.g., a rotated binary phase shift keying (BPSK)) for mode detection. For example, the transmission mode information may be transmitted on an axis orthogonal to the constellation used in transmission of the VHT-SIG field.

Figure 6:
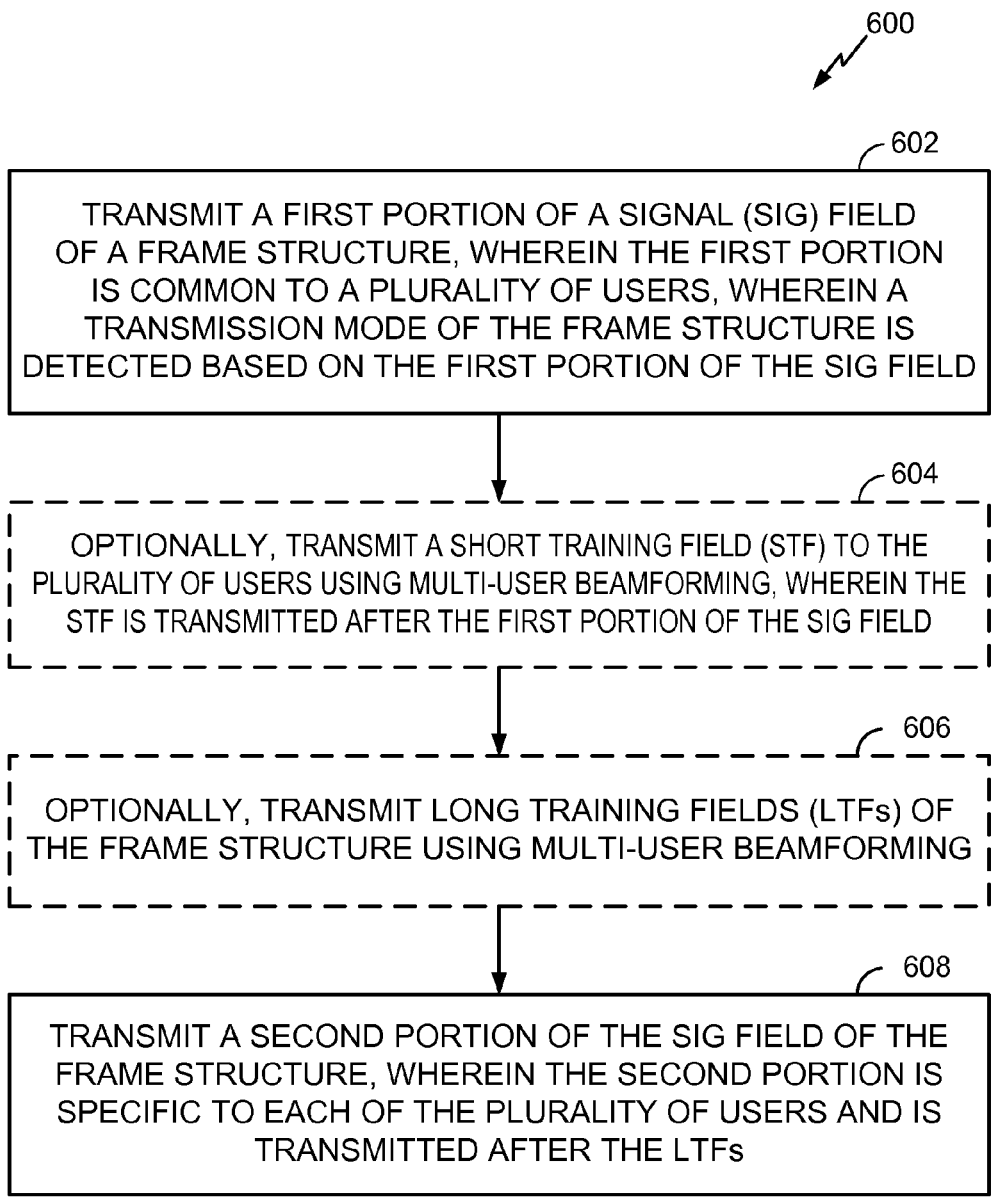
FIG. 6 illustrates example operations for transmitting a frame suitable for mode detection, in accordance with certain aspects of the present disclosure.

FIG. 6 illustrates example operations 600 for transmitting a frame suitable for mode detection, in accordance with certain aspects of the present disclosure. At 602, the transmitter generates a frame structure comprising a signal (SIG) field. At 604, the transmitter transmits a first portion of the SIG field of the frame structure, wherein the first portion is common to a plurality of users and a transmission mode of the frame structure is detected based on the first portion of the SIG field. At 606, the transmitter may transmit an STF to the plurality of users using multi-user beamforming, wherein the STF is transmitted after the first portion of the SIG field.

At 608, the transmitter may transmit LTFs of the frame structure using multi-user beamforming. At 610, the transmitter transmits a second portion of the SIG field of the frame structure, wherein the second portion is specific to each of the plurality of users. The second portion of the SIG field may be beamformed to each user and may be transmitted after the LTFs.

For certain aspects, the second portion of the SIG field may comprise an MCS and transmission length for each user. In addition, the second portion of the SIG field may be transmitted by utilizing a single spatial stream MCS.

Figure 7:
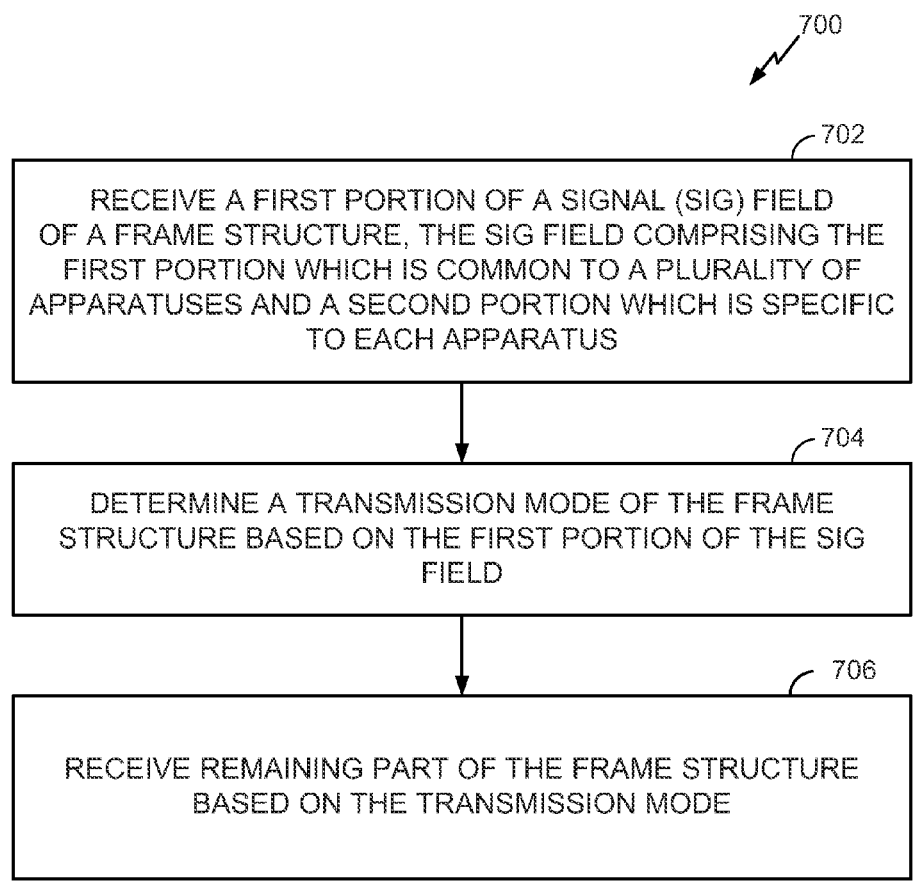
FIG. 7 illustrates example operations for detecting transmission mode of a received signal at a receiver, in accordance with certain aspects of the present disclosure.

FIG. 7 illustrates example operations 700 for detecting transmission mode of a received signal at a receiver, in accordance with certain aspects of the present disclosure. At 702, a receiver receives a first portion of a SIG field of a frame structure, the SIG field comprising the first portion which is common to a plurality of apparatuses and a second portion which is specific to each apparatus. At 704, the receiver determines transmission mode of the frame structure based on the first portion of the SIG field, wherein the transmission mode is in compliance with at least one of the IEEE 802.11ac/n/a standards. At 706, the receiver receives remaining part of the frame structure based on the transmission mode. The transmission mode may comprise the IEEE 802.11ac/a/n standards.

Certain aspects of the present disclosure propose techniques to include information about transmission mode of a signal in the preamble of a frame so that the receivers can detect mode of transmissions and process the received signals correctly.

Figure 6A:
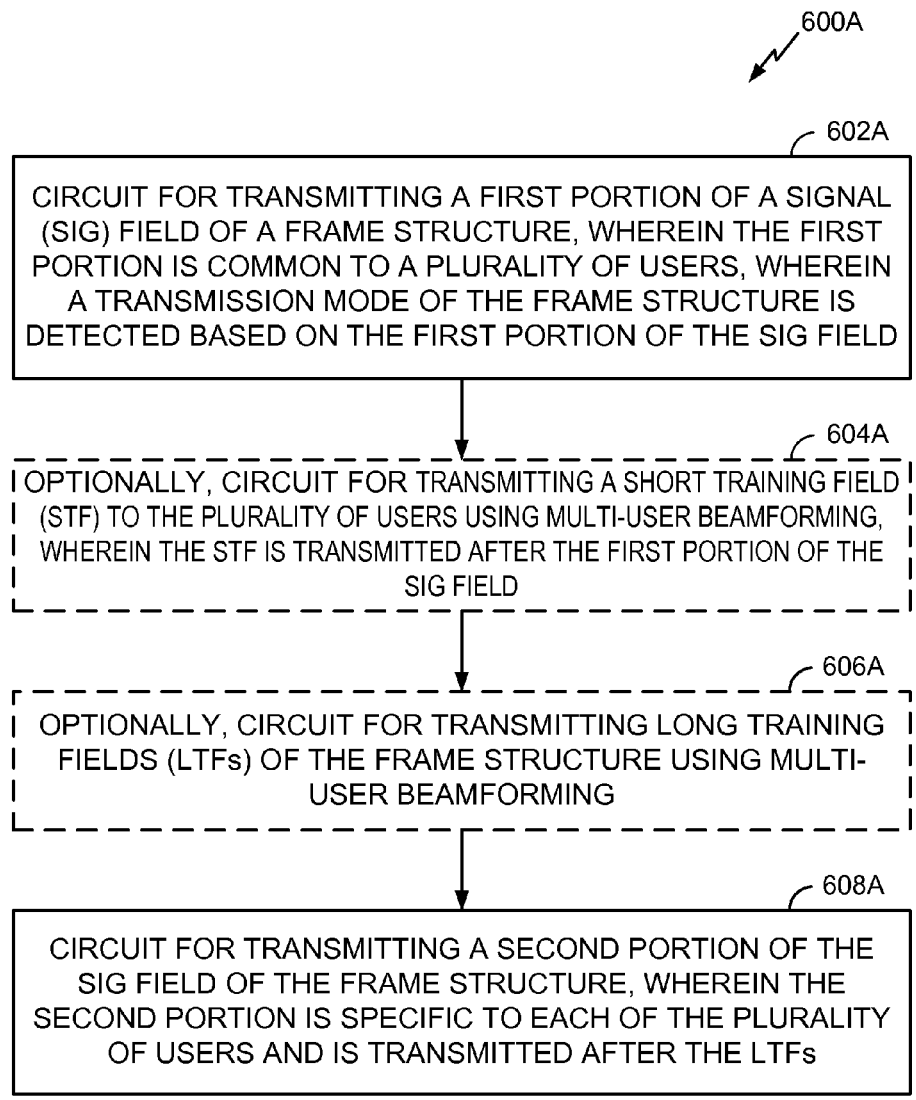
FIG. 6A illustrates example components capable of performing the operations shown in FIG. 6.
Figure 7A:
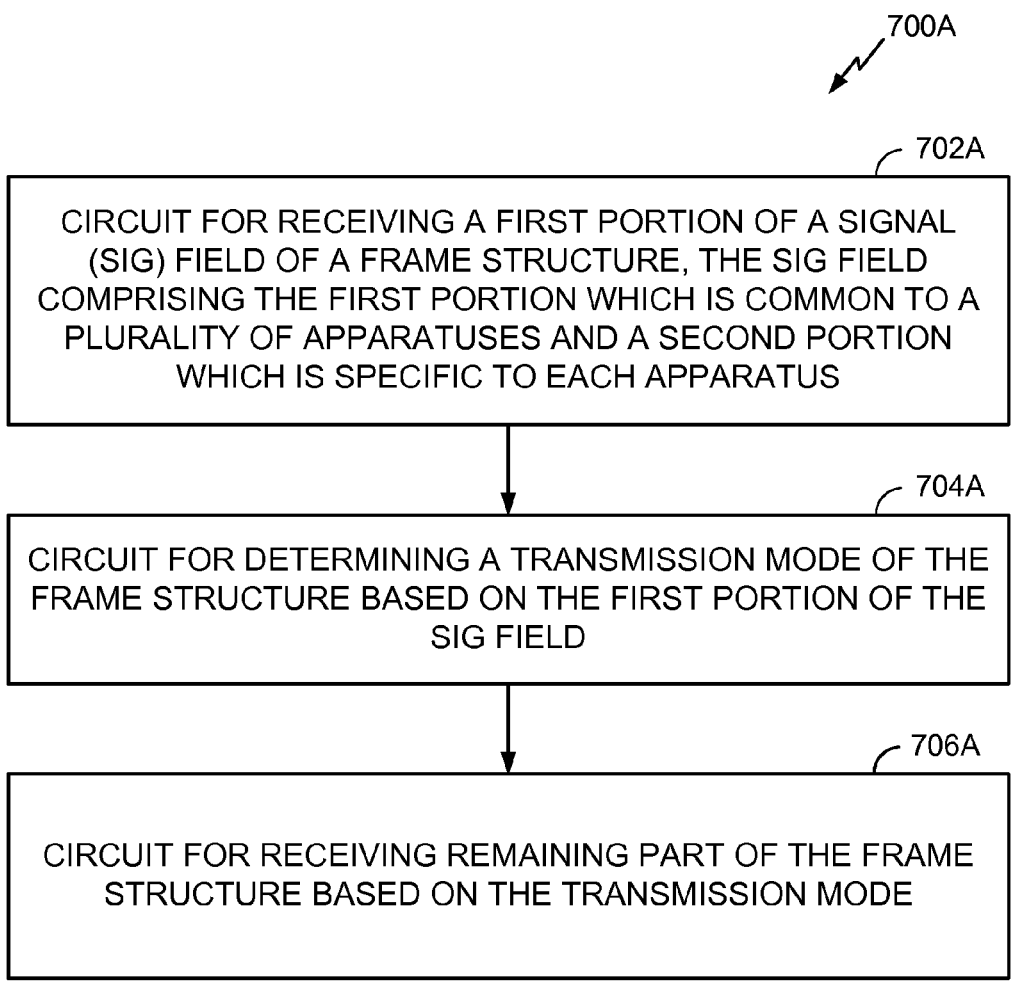
FIG. 7A illustrates example components capable of performing the operations shown in FIG. 7.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, blocks 602-610 in FIG. 6 correspond to circuit blocks 602A-610A illustrated in FIG. 6A. In addition, blocks 702-706 in FIG. 7 correspond to circuit blocks 702A-706A illustrated in FIG. 7A.

For certain aspects, means for receiving comprises a receiver, means for transmitting comprises a transmitter and means for determining a transmission mode comprises a circuit configured to determine the transmission mode of the signal.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, the phrase "at least one of A or B" is meant to include any combination of A and B. In other words, "at least one of A or B" comprises the following set: [A], [B] and [A, B].

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The techniques provided herein may be utilized in a variety of applications. For certain aspects, the techniques presented herein may be incorporated in an access point station, an access terminal, a mobile handset, or other type of wireless device with processing logic and elements to perform the techniques provided herein.

While the foregoing is directed to aspects of the present disclosure, other and further aspects of the disclosure may be devised without departing from the basic scope thereof, and the scope thereof is determined by the claims that follow.

The invention claimed is:

1. A method for wireless communications, comprising:
   generating a frame structure comprising a signal (SIG) field;
   transmitting a first portion of the SIG field of the frame structure, wherein:
      the first portion of the SIG field is common to a plurality of apparatuses;
      the first portion of the SIG field comprises an indication of a transmission mode of the frame structure; and
      the transmission mode indicates a type of the frame structure; and
   transmitting a second portion of the SIG field of the frame structure, wherein the second portion of the SIG field is specific to each of the plurality of apparatuses, and wherein the indication of the transmission mode is transmitted on an axis that is orthogonal to a constellation used to transmit a third portion of the SIG field.

2. The method of claim 1, wherein the first or the second portion of the SIG field comprises at least one orthogonal frequency division multiplexing (OFDM) symbol.

3. The method of claim 1, wherein transmitting the second portion of the SIG field comprises beamforming the second portion to the plurality of apparatuses.

4. The method of claim 3, further comprising:
performing training to obtain signatures for the plurality of apparatuses to use in the beamforming.

5. The method of claim 1, further comprising:
transmitting long training fields (LTFs) of the frame structure; and
transmitting the second portion of the SIG field after transmitting the LTFs.

6. The method of claim 5, wherein the transmission of the second portion of the SIG field indicates the transmission of the long training fields is finished.

7. The method of claim 1, wherein the second portion of the SIG field is transmitted after a long training field (LTF).

8. The method of claim 1, further comprising:
transmitting a short training field (STF) to the plurality of apparatuses, wherein the STF is transmitted after the first portion of the SIG field.

9. The method of claim 8, wherein the STF is used by the apparatuses to adjust automatic gain control (AGC) setting for each apparatus.

10. The method of claim 1, wherein the second portion of the SIG field indicates a number of long training fields that follow the second portion of the SIG field.

11. The method of claim 1, wherein the first portion of the SIG field indicates a number of long training fields.

12. The method of claim 1, wherein the first portion of the SIG field comprises information about at least one of bandwidth of the transmission, a modulation and coding scheme, or a length of the longest multiuser multiple input multiple output (MU-MIMO) transmission among all spatial streams.

13. The method of claim 1, wherein the second portion of the SIG field comprises at least one of a modulation and coding scheme (MCS) or a transmission length for each of the apparatuses.

14. The method of claim 1, wherein the second portion of the SIG field is transmitted by utilizing a single spatial stream modulation and coding scheme (MCS).

15. The method of claim 1, further comprising:
transmitting a plurality of symbols to the apparatuses by using multi-user beamforming, wherein the symbols are transmitted after the first portion of the SIG field.

16. The method of claim 1, wherein the type of the frame structure is associated with a particular IEEE 802.11 standard.

17. An apparatus for wireless communications, comprising:
a circuit configured to generate a frame structure comprising a signal (SIG) field; and
a transmitter configured to transmit a first portion of the SIG field of the frame structure, wherein:
the first portion of the SIG field is common to a plurality of apparatuses;
the first portion of the SIG field comprises an indication of a transmission mode of the frame structure;
the transmission mode indicates a type of the frame structure;
the transmitter is further configured to transmit a second portion of the SIG field of the frame structure;
the second portion of the SIG field is specific to each of the plurality of apparatuses; and
the indication of the transmission mode is transmitted on an axis that is orthogonal to a constellation used to transmit a third portion of the SIG field.

18. The apparatus of claim 17, wherein the first or the second portion of the SIG field comprises at least one orthogonal frequency division multiplexing (OFDM) symbol.

19. The apparatus of claim 17, wherein the transmitter configured to transmit the second portion of the SIG field is also configured to beamform the second portion to the plurality of apparatuses.

20. The apparatus of claim 19, further comprising:
circuit configured to perform training to obtain signatures for the plurality of apparatuses to use in the beamforming.

21. The apparatus of claim 17, wherein the transmitter is further configured to transmit long training fields (LTFs) of the frame structure, and transmit the second portion of the SIG field after transmitting the LTFs.

22. The apparatus of claim 21, wherein the transmission of the second portion of the SIG field indicates the transmission of the long training fields is finished.

23. The apparatus of claim 17, wherein the second portion of the SIG field is transmitted after a long training field (LTF).

24. The apparatus of claim 17, wherein the transmitter is further configured to transmit a short training field (STF) to the plurality of apparatuses, wherein the STF is transmitted after the first portion of the SIG field.

25. The apparatus of claim 24, wherein the STF is used by the apparatuses to adjust automatic gain control (AGC) setting for each apparatus.

26. The apparatus of claim 17, wherein the second portion of the SIG field indicates a number of long training fields that follow the second portion of the SIG field.

27. The apparatus of claim 17, wherein the first portion of the SIG field indicates a number of long training fields.

28. The apparatus of claim 17, wherein the first portion of the SIG field comprises information about at least one of bandwidth of the transmission, a modulation and coding scheme, or a length of the longest multiuser multiple input multiple output (MU-MIMO) transmission among all spatial streams.

29. The apparatus of claim 17, wherein the second portion of the SIG field comprises at least one of a modulation and coding scheme (MCS) or a transmission length for each of the apparatuses.

30. The apparatus of claim 17, wherein the second portion of the SIG field is transmitted by utilizing a single spatial stream modulation and coding scheme (MCS).

31. The apparatus of claim 17, the transmitter is further configured to transmit a plurality of symbols to the apparatuses by using multi-user beamforming, wherein the symbols are transmitted after the first portion of the SIG field.

32. The apparatus of claim 17, wherein the type of the frame structure is associated with one of the IEEE 802.11ac standard, the IEEE 802.11n standard, or the IEEE 802.11a standard.

33. An apparatus for wireless communications, comprising:
means for generating a frame structure comprising a signal (SIG) field; and
means for transmitting a first portion of the SIG field of the frame structure, wherein:
the first portion of the SIG field is common to a plurality of apparatuses;
the first portion of the SIG field comprises an indication of a transmission mode of the frame structure;
the transmission mode indicates a type of the frame structure;

the means for transmitting is further configured to transmit a second portion of the SIG field of the frame structure; and
the second portion of the SIG field is specific to each of the plurality of apparatuses, wherein the indication of the transmission mode is transmitted on an axis that is orthogonal to a constellation used to transmit a third portion of the SIG field.

34. The apparatus of claim 33, wherein the first or the second portion of the SIG field comprises at least one orthogonal frequency division multiplexing (OFDM) symbol.

35. The apparatus of claim 33, wherein the means for transmitting the second portion of the SIG field is further configured to beamform the second portion to the plurality of apparatuses.

36. The apparatus of claim 35, further comprising:
means for performing training to obtain signatures for the plurality of apparatuses to use in the beamforming.

37. The apparatus of claim 33, wherein the means for transmitting is further configured to transmit long training fields (LTFs) of the frame structure, and transmit the second portion of the SIG field after transmitting the LTFs.

38. The apparatus of claim 37, wherein the transmission of the second portion of the SIG field indicates the transmission of the long training fields is finished.

39. The apparatus of claim 33, wherein the second portion of the SIG field is transmitted after a long training field (LTF).

40. The apparatus of claim 33, wherein the means for transmitting is further configured to transmit a short training field (STF) to the plurality of apparatuses, wherein the STF is transmitted after the first portion of the SIG field.

41. The apparatus of claim 40, wherein the STF is used by the apparatuses to adjust automatic gain control (AGC) setting for each apparatus.

42. The apparatus of claim 33, wherein the second portion of the SIG field indicates a number of long training fields that follow the second portion of the SIG field.

43. The apparatus of claim 33, wherein the first portion of the SIG field indicates a number of long training fields.

44. The apparatus of claim 33, wherein the first portion of the SIG field comprises information about at least one of bandwidth of the transmission, a modulation and coding scheme, or a length of the longest multiuser multiple input multiple output (MU-MIMO) transmission among all spatial streams.

45. The apparatus of claim 33, wherein the second portion of the SIG field comprises at least one of a modulation and coding scheme (MCS) or a transmission length for each of the apparatuses.

46. The apparatus of claim 33, wherein the second portion of the SIG field is transmitted by utilizing a single spatial stream modulation and coding scheme (MCS).

47. The apparatus of claim 33, wherein the means for transmitting is further configured to transmit a plurality of symbols to the apparatuses by using multi-user beamforming, wherein the symbols are transmitted after the first portion of the SIG field.

48. A computer-readable device for wireless communications, the computer-readable device encoded with instructions executable for:
generating a frame structure comprising a signal (SIG) field;
transmitting a first portion of the SIG field of the frame structure, wherein:
the first portion of the SIG field is common to a plurality of apparatuses;
the first portion of the SIG field comprises an indication of a transmission mode of the frame structure; and
the transmission mode indicates a type of the frame structure; and
transmitting a second portion of the SIG field of the frame structure, wherein the second portion of the SIG field is specific to each of the plurality of apparatuses, and wherein the indication of the transmission mode is transmitted on an axis that is orthogonal to a constellation used to transmit a third portion of the SIG field.

49. An access point for wireless communications, comprising:
a plurality of antennas,
a circuit configured to generate a frame structure comprising a signal (SIG) field; and
a transmitter configured to transmit, via the plurality of antennas, a first portion of the SIG field of the frame structure, wherein:
the first portion of the SIG field is common to a plurality of apparatuses;
the first portion of the SIG field comprises an indication of a transmission mode of the frame structure;
the transmission mode indicates a type of the frame structure;
the transmitter is further configured to transmit a second portion of the SIG field of the frame structure;
the second portion of the SIG field is specific to each of the plurality of apparatuses; and
the indication of the transmission mode is transmitted on an axis that is orthogonal to a constellation used to transmit a third portion of the SIG field.

* * * * *